United States Patent
Kramer

(12) 
(10) Patent No.: US 6,276,495 B1
(45) Date of Patent: Aug. 21, 2001

(54) BRAKE TEMPERATURE MONITOR USING HEAT PIPE

(75) Inventor: Dennis A. Kramer, Troy, MI (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/528,418

(22) Filed: Mar. 17, 2000

(51) Int. Cl.[7] .............................. B60Q 1/00; F16D 66/00
(52) U.S. Cl. ........................ 188/1.11 E; 188/1.11 R; 340/453; 340/588
(58) Field of Search .................. 188/1.11 R, 1.11 E, 188/1.11 L, 1.11 W, 79.52; 116/208, 216, 207; 340/453, 454, 870.17, 449, 501, 588; 374/141; 73/121, 129

(56) References Cited

U.S. PATENT DOCUMENTS

| | | | |
|---|---|---|---|
| 4,824,260 | * | 4/1989 | Novotny et al. ................. 188/1.11 L |
| 5,559,286 | * | 9/1996 | White et al. ........................ 340/454 |
| 5,637,794 | * | 6/1997 | Hanisko .............................. 188/1.11 |
| 5,651,431 | * | 7/1997 | Kyrtsos ........................... 188/1.11 L |
| 5,668,529 | * | 9/1997 | Kyrtsos . | |
| 5,731,975 | * | 3/1998 | Nakashima . | |
| 5,909,171 | * | 6/1999 | Kyrtsos ........................... 188/1.11 W |
| 5,939,978 | * | 8/1999 | Kyrtsos ........................... 188/1.11 L |
| 5,992,579 | * | 11/1999 | Kyrtsos ........................... 188/1.11 L |

FOREIGN PATENT DOCUMENTS

| | | | |
|---|---|---|---|
| 2503726 | * | 8/1976 | (DE) . |
| 3502053 | * | 7/1986 | (DE) . |
| 4231107 | * | 3/1994 | (DE) . |
| 9217769 | * | 8/1997 | (JP) . |

* cited by examiner

*Primary Examiner*—Douglas C. Butler
(74) *Attorney, Agent, or Firm*—Carlson, Gaskey & Olds

(57) ABSTRACT

A brake shoe assembly includes a backing plate and a brake lining. The brake lining has an interface surface abutting the backing plate and a frictionally engaging surface that frictionally contacts a vehicle. The brake lining is provided with a temperature measuring system embedded therein which may measure the temperature directly on the frictionally engaging surface of the brake lining material by way of a heat pipe. The temperature measuring device communicates with a control that activates a signal when a predetermined abnormal degree of heat is generated on the frictionally engaging surface of the brake lining. Thus, a fault in the braking mechanism is indicated.

14 Claims, 1 Drawing Sheet

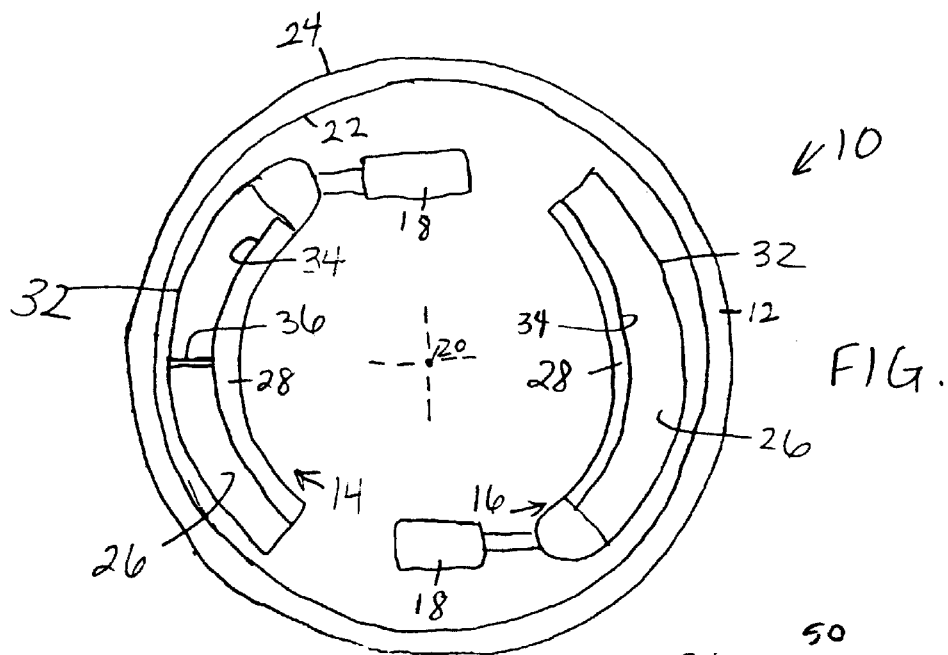
FIG. 1A
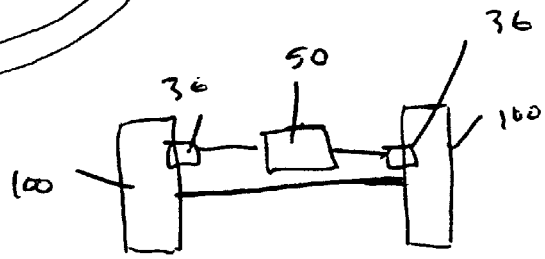
Fig 1B
FIG. 2
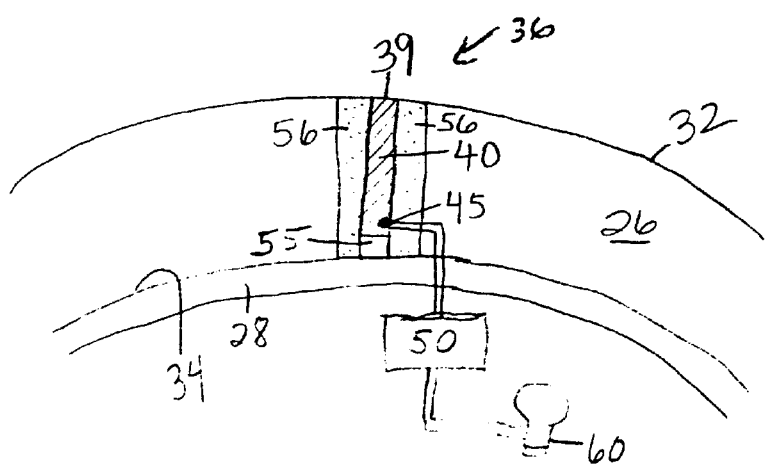

BRAKE TEMPERATURE MONITOR USING HEAT PIPE

BACKGROUND OF THE INVENTION

This application relates to a temperature measuring system in a brake shoe assembly that uses a thermally conductive heat pipe to comparatively measure the temperature of the brake lining at the point of the frictionally engaging surface of the brake lining.

Most motor vehicles include a brake system having a set of brake shoe assemblies for slowing rotation of the wheels of the vehicle when the brakes are applied. Typically, each brake shoe assembly includes a brake lining material that frictionally engages a portion of a wheel of the vehicle when the brakes are applied. Such frictional contact results in the generation of heat at the frictionally engaging, or wearable, surface of the brake lining. Of course, some degree of heat generation at the wearable surface of the brake lining is expected and normal. However, an abnormal degree of heat generated is an indication of a fault in the braking mechanism.

An example of an abnormal degree of heat generation occurs in the case of a dragging brake. The brakes are applied and normal frictional engagement between the lining of the brake shoe and the wheels occurs. Once the brakes are no longer applied, the brake shoe assumes an out of service position of non-engagement with the wheel. However, a dragging brake does not fully assume an out of service position and therefore, some frictional engagement continues. Thus, an abnormal generation of heat occurs at the wearable surface of the brake lining.

Another example of an abnormal degree of heat generation may occur when comparing the wearable surface heat of the brake shoe of one wheel to that of its respective mate across the axle of a vehicle. Significant variations on temperature of the brake linings of respective wheel pairs is an indication of unbalanced wheels, or a fault in one of the braking components.

Various methods using temperature to predict lining wear, but not to measure temperature itself are disclosed in co-pending application Ser. No. 09/176,490 filed Oct. 21, 1998, entitled "Packaging A Temperature Sensing Brake Lining Wear Indicator In A Brake Shoe Assembly".

It would be desirable to provide a temperature measuring system in a brake shoe assembly that can directly measure the temperature of the brake shoe lining at its frictionally engaging, or wearable, surface. It would further be desirable to provide a system to alert a vehicle user of an abnormal temperature reading at the wearable surface of the brake shoe lining.

SUMMARY OF THE INVENTION

In a disclosed embodiment of this invention, a brake shoe assembly includes a backing plate and a brake lining. The brake lining has an interface surface abutting the backing plate and a wearable surface for frictionally engaging a portion of a wheel of a vehicle. A temperature measuring system includes a temperature measuring device which is embedded in the brake lining at a position adjacent the interface surface of the brake lining. The temperature measuring device communicates directly with the frictionally engaging, or wearable, surface of the brake lining by way of a wearable heat pipe that exhibits highly conductive thermal properties.

In one embodiment, the heat may be approximately one eighth of an inch in diameter. Preferably, it is made of copper or brass which are highly conductive materials and provide fast response when transmitting the heat generated on the frictionally engaging surface of the brake lining to the temperature measurement device positioned at a point that is deeper in the brake shoe.

The temperature measurement device is of a known type and may be a thermistor which measures temperature continuously or a poly switch which is actuated when a predetermined temperature is attained. A control receives a signal from the temperature measurement device and determines an abnormal brake condition based on the signal.

The thermally conductive heat pipe may be thermally isolated from the adjacent brake lining material by surrounding the heat pipe with thermally insulative material. The heat pipe may also be thermally insulated from the backing plate of the brake shoe.

These and other features of the present invention will be best understood from the following specification and drawings, the following of which is a brief description.

BRIEF DESCRIPTION OF THE DRAWINGS

FIG. 1A is a schematic side view of a drum brake system using a brake lining temperature measuring assembly in accordance with the present invention.

FIG. 1B is a schematic view of a vehicle incorporating a temperature measuring assembly.

FIG. 2 is a schematic cross sectional view of the brake lining temperature measuring assembly in accordance with the present invention.

DETAILED DESCRIPTION OF THE PREFERRED EMBODIMENT

Referring to FIG. 1A, a schematic view of a brake shoe assembly having a brake lining temperature measuring system in accordance with the present invention is shown. The inventive brake shoe assembly, as described below, may be incorporated into several different types of conventional brake systems including, but not limited to, drum and disc brake systems. Thus, the brake shoe assembly has been schematically illustrated in a drum brake system in the Figures for descriptive purposes only and not to limit the scope of the present invention.

FIG. 1A is a schematic view of a side of a drum brake system 10. The drum brake system includes a cylindrical brake drum 12, a first brake shoe assembly generally shown at 14, a second brake shoe assembly generally shown at 16, and an actuator 18. The general operation of the brake drum assembly 10 is known. The first and second brake shoe assemblies 14 and 16 are preferably identical such that a description of the first brake shoe assembly 14 or its components is also applicable to the second brake shoe assembly 16. The drum brake system 10 can be of various types of systems such as an s-cam brake, a wedge brake, or a drum brake actuated by a hydraulic cylinder. The actuator 18, shown schematically in FIG. 1A, represents any known actuating mechanism for drum brake systems. The actuator moves the first and second brake shoe assemblies 14 and 16 into contact with the rotating brake drum 12 and can be controlled hydraulically or pneumatically. As known, a single actuator may also actuate both brake shoe assemblies 14 and 16.

The brake drum 12, which rotates about an axis of rotation 20, has an inner surface 22 and an outer surface 24. The first and second brake shoe assemblies 14 and 16, located adjacent to the inner surface 22 of the brake drum 12, include a brake lining 26. The brake linings 26 are comprised of a known friction material attached to a backing plate 28. Each brake lining 26 presents a frictionally engaging, or wearable, surface 32 which frictionally contacts the inner surface 22 of the rotating brake drum 12 when the brake is actuated. Such frictional contact results in the generation of heat at the frictionally engaging surface 32 of the brake lining 26. Each brake lining 26 further includes an interface surface 34 which abuts backing plate 28.

A brake lining temperature measuring system 36 is located on the first brake shoe assembly 14. This temperature measuring system 36 can be located on either the first and/or the second brake shoe assemblies 14 and 16, but typically need only be incorporated in the leading brake shoe assembly which experiences the most brake activity.

As shown in FIG. 1B, the vehicle has two wheels 100 spaced across the width of the vehicle. As shown, the wheels 100 each have a system 36 associated with a brake, and the two systems 36 communicate with a control 50.

As shown schematically in FIG. 2, the temperature measuring system 36 comprises a heat pipe 40 embedded in brake shoe lining material 26 and a temperature measuring device 45. Temperature measuring device 45 is positioned adjacent the interface surface 34 of the brake lining 26. The temperature measuring device 45 communicates directly with the frictionally engaging, or wearable, surface 32 of brake lining 26 by way of the distal wear end 39 of a heat pipe 40 that exhibits highly conductive thermal properties thus enabling a fast sensory response from temperature measuring device 45. In one embodiment, heat pipe 40 is approximately one eighth of an inch in diameter, and made of copper or brass, or other highly conductive materials. Thus, heat pipe 40 provides the desired fast transmission of heat from the frictionally engaging surface 32 of brake lining 26 to the temperature measurement device 45 positioned at a deeper point in the brake shoe lining 26 adjacent backing plate 28.

The temperature measurement device 45 is of a known type and may be a thermistor which measures temperature continuously or a poly switch which is actuated when a predetermined high temperature is attained.

The thermally conductive heat pipe 40 may be surrounded with an insulating material 56 to isolate it from non-homogenous brake lining 26. Additional thermal insulation 55 may be provided to insulate heat pipe 40 from the backing plate 28. Either insulating material 55 or 56 may be used independently.

As schematically shown in FIG. 2, temperature measuring device 45 communicates with a control 50 which then activates a signal 60. This occurs when a predetermined abnormal degree of heat generated at the brake lining 26 is measured. Thus, a fault in the braking mechanism is indicated.

Further, the control of FIG. 1B compares the temperatures from the two wheels 100 and control 50 can indicate an abnormal condition by comparing the two temperatures.

A preferred embodiment of this invention has been disclosed. However, a worker of ordinary skill in the art would recognize that certain modifications would come within the scope of this invention. For that reason, the following claims should be studied to determine the true scope and content of this invention.

What is claimed is:

1. A brake shoe assembly for a vehicle comprising:
    a backing plate;
    a brake lining having an interface surface abutting said backing plate and a frictionally engaging surface for frictionally contacting the vehicle; and
    a temperature sensing system embedded in said brake lining for determining the temperature of the brake lining at said frictionally engaging surface, said temperature sensing system including a thermally conductive heat pipe having a thermal conductivity greater than said brake lining for providing a communication path from a distal wear end flush with said frictionally engaging surface of the brake lining to a temperature measuring device.

2. A break shoe assembly as recited in claim 1, wherein said temperature measuring device is adjacent said interface surface.

3. A brake shoe assembly as recited in claim 1, wherein said heat pipe is made from a metal including copper.

4. A brake shoe assembly as recited in claim 3, wherein said metal is brass.

5. A brake shoe assembly as recited in claim 3, wherein said temperature measuring device communicates with a control which activates a signal when an abnormal temperature occurs at the frictionally engaging surface of the brake lining to indicate a fault in said brake shoe assembly.

6. A brake shoe assembly as recited in claim 5, wherein said heat pipe is thermally isolated from said brake lining.

7. A brake shoe assembly as recited in claim 5, wherein said heat pipe is thermally insulated from said backing plate.

8. A brake shoe assembly as recited in claim 1, wherein said heat pipe is thermally isolated from said brake lining.

9. A brake shoe assembly as recited in claim 1, wherein said heat pipe is thermally insulated from said backing plate.

10. A brake shoe assembly for a vehicle comprising:
    a backing plate;
    a brake lining having an interface surface abutting said backing plate and a frictionally engaging surface for frictionally contacting the vehicle;
    a temperature sensing system embedded in said brake lining for determining the temperature of the brake lining at said frictionally engaging surface;
    wherein said temperature sensing system includes a thermally conductive heat pipe having a thermal conductivity greater than said brake lining for providing a rapid communication path from said distal wear end to said temperature measuring device and having a distal wear end flush with said frictionally engaging surface of the brake lining; and
    a temperature measuring device adjacent said interface surface.

11. A brake shoe assembly as recited in claim 10, wherein said temperature measuring device communicates with a control which activates a signal when an abnormal temperature occurs at the frictionally engaging surface of the brake lining to indicate a fault in said brake shoe assembly.

12. A brake shoe assembly as recited in claim 10, wherein said heat pipe is made from a metal containing copper.

13. A brake assembly comprising:
    a brake having a brake shoe including a backing plate and a lining material, said brake being operable to move said lining material toward a rotating surface on a vehicle;

a temperature sensing system embedded in said brake lining for determining the temperature of the brake lining at a frictionally engaging surface, and including a temperature transmission heat pipe extending from an outer surface of said lining material to communicate with a temperature measuring device also associated with said brake shoe; and a control receiving a signal from said temperature measuring device, said control being operable to determine an abnormal condition based upon the temperatures from said temperature measuring device.

14. A brake as recited in claim 13, wherein there are a pair of opposed brake assemblies from being mounted on each side of a vehicle, each of said brake assemblies having a temperature sensing system, and each of said temperature measuring devices in said temperature sensing system communicating with a single control, said control comparing temperatures from said pair of brake assemblies and indicating an abnormal condition should said temperatures differ by more than a predetermined amount.

* * * * *